United States Patent [19]
Marrone

[11] 3,874,690
[45] Apr. 1, 1975

[54] BABY STROLLER
[75] Inventor: Benny S. Marrone, Independence, Mo.
[73] Assignee: The Raymond Lee Organization, Inc., New York, N.Y. ; a part interest
[22] Filed: Aug. 28, 1973
[21] Appl. No.: 392,285

[52] U.S. Cl...... 280/47.39, 280/47.41, 280/87.02 W
[51] Int. Cl.............................................. B62b 7/00
[58] Field of Search............ 280/47.38, 47.30, 47.4, 280/47.41, 87.02 R, 87.02 W; 297/5

[56] References Cited
UNITED STATES PATENTS

| | | |
|---|---|---|
| 765,875 | 7/1904 | Blake .......................... 280/87.02 W |
| 1,313,330 | 8/1919 | Pocock ........................ 280/87.02 W |
| 2,308,626 | 1/1943 | Reinholz ...................... 280/87.02 W |
| 2,631,651 | 3/1953 | Boysel.......................... 280/47.39 X |
| 2,842,374 | 7/1958 | Benson et al. ................. 280/47.39 |
| 3,248,125 | 4/1966 | Gill.............................. 280/47.41 X |

Primary Examiner—M. Henson Wood, Jr.
Assistant Examiner—John J. Love
Attorney, Agent, or Firm—Daniel Jay Tick

[57] ABSTRACT

A baby stroller comprises a baby seat rotatably mounted on a wheeled base for free rotation about its axis thereby enabling a baby therein to selectively rotate himself in the seat.

2 Claims, 1 Drawing Figure

PATENTED APR 1 1975  3,874,690
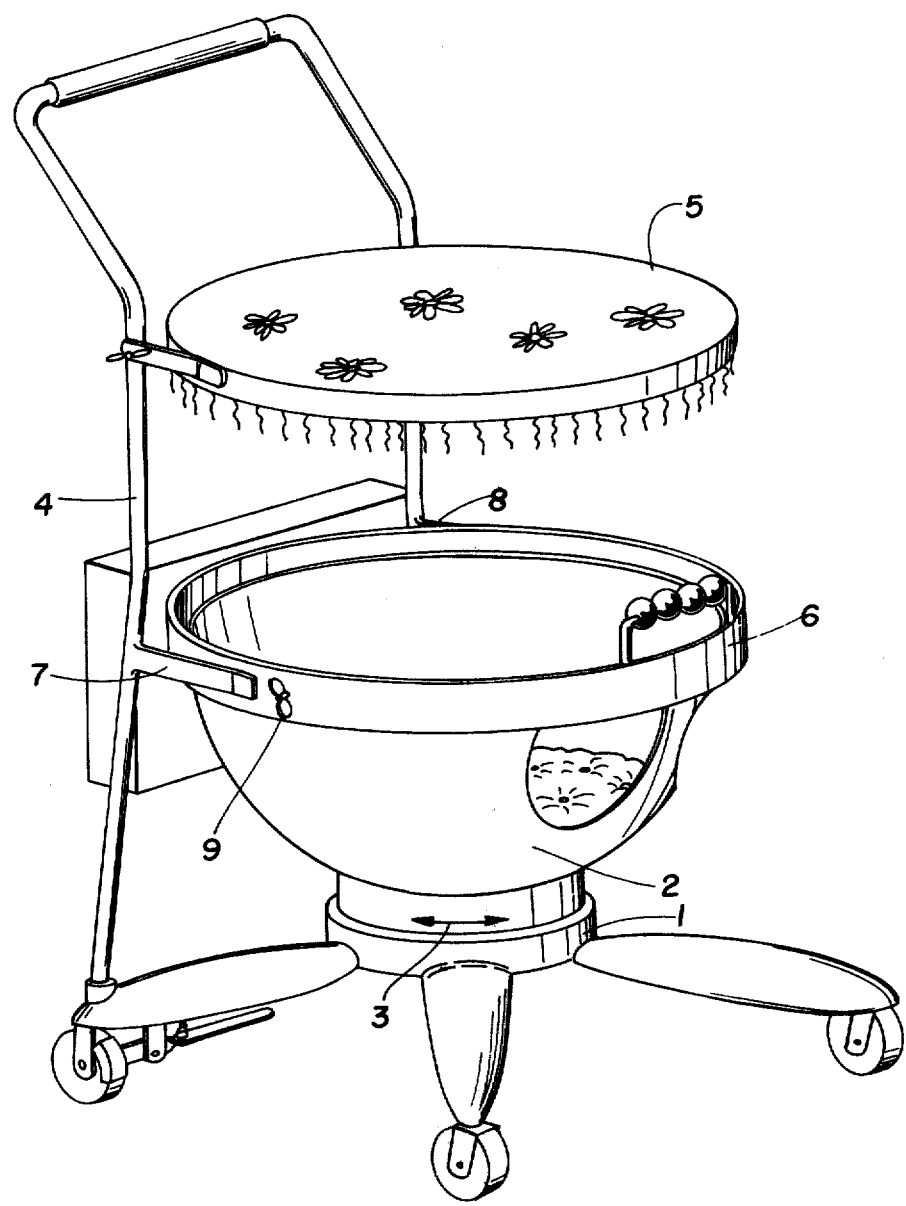

BABY STROLLER

DESCRIPTION OF THE INVENTION

The present invention relates to a baby stroller.

Objects of the invention are to provide a baby stroller of simple structure which enables a baby seated therein to selectively rotate himself in a complete circle so that he may face his mother, as desired, and enables the mother to rotate the baby in a similar manner.

In order that the invention may be readily carried into effect, it will now be described with reference to the accompanying drawing, wherein the single FIGURE is a schematic diagram of an embodiment of the baby stroller of the invention.

The baby stroller of the invention has a wheeled base 1. a baby seat 2 is rotatably mounted on the base 1 for free rotation about its axis, as indicated by arrows 3. This enables a baby (not shown in the Figure) seated in the baby seat 2 to selectively rotate himself in the seat.

The stroller has a frame 4 affixed to the base 1 and extending higher than the seat 2 to facilitate pushing of the stroller. An awning 5 is mounted on the frame 4 and extends over the seat 2 at a distance therefrom.

A ring 6 is provided around the baby seat 2 in close proximity therewith but spaced therefrom. The ring 6 is stationarily affixed to the frame 4 via a pair of arms 7 and 8. This enables a baby in the seat 2 to rotate himself by grasping the ring 6 and pushing or pulling.

The stroller of the invention has a brake device on the ring 6 for releasably holding the baby seat 2 in a selected position. In the illustrated example, the braking device comprises a wing nut 9 threadedly coupled in an internally threaded bore through the ring 6 and adapted to selectively engage the baby seat 2 when the wing nut is rotated in one direction and to disengage when rotated in the opposite direction.

While the invention has been described by means of a specific example and in a specific embodiment, I do not wish to be limited thereto, for obvious modifications will occur to those skilled in the art without departing from the spirit and scope of the invention.

I claim:

1. A baby stroller having a wheeled base, said stroller comprising
   a baby seat rotatably mounted on the base for free rotation about its axis thereby enabling a baby therein to selectively rotate himself in the seat, the stroller having a frame affixed to the base and extending higher than the seat to facilitate pushing of the stroller and an awning mounted on the frame and extending over the seat at a distance therefrom; and
   a ring around the baby seat in close proximity therewith but spaced therefrom and means stationarily affixing the ring to the frame in a manner whereby a baby in the seat may rotate himself by grasping the ring and pushing or pulling.

2. A baby stroller as claimed in claim 1, further comprising a brake device on the ring for releasably holding the baby seat in a selected position.

* * * * *